(12) United States Patent
Lin

(10) Patent No.: US 12,185,283 B2
(45) Date of Patent: Dec. 31, 2024

(54) FEEDBACK CHANNEL MAPPING AND MULTIPLEXING HARQ REPORTS IN NR SIDELINK COMMUNICATION

(71) Applicant: GUANGDONG OPPO MOBILE TELECOMMUNICATIONS CORP., LTD., Dongguan (CN)

(72) Inventor: Huei-Ming Lin, Taipei (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 275 days.

(21) Appl. No.: 17/713,537

(22) Filed: Apr. 5, 2022

(65) Prior Publication Data

US 2022/0232529 A1    Jul. 21, 2022

Related U.S. Application Data

(63) Continuation of application No. PCT/CN2020/126194, filed on Nov. 3, 2020.
(Continued)

(51) Int. Cl.
*H04W 72/02* (2009.01)
*H04L 1/1812* (2023.01)
(Continued)

(52) U.S. Cl.
CPC .......... *H04W 72/02* (2013.01); *H04L 1/1812* (2013.01); *H04L 5/0053* (2013.01);
(Continued)

(58) Field of Classification Search
None
See application file for complete search history.

(56) References Cited

U.S. PATENT DOCUMENTS

2012/0281647 A1    11/2012   Kuo et al.
2018/0255532 A1     9/2018   Li et al.
(Continued)

FOREIGN PATENT DOCUMENTS

CN    108347313 A    7/2018
CN    109644433 A    4/2019
(Continued)

OTHER PUBLICATIONS

Author Unknown, Discussion on physical layer procedures for NR sidelink, Doc. No. R1-1910783, pp. 1-23, Oct. 20, 2019.*
(Continued)

*Primary Examiner* — Christopher M Crutchfield
(74) *Attorney, Agent, or Firm* — Sheppard, Mullin, Richter & Hampton LLP

(57) ABSTRACT

The present disclosure relates to the field of feedback channel mapping and multiplexing HARQ reports in New Radio Sidelink (SL) communication. A method of operating a user equipment (UE) performing SL communication includes providing a procedure to the UE, the procedure allowing the UE to determine a Physical Sidelink Feedback Channel (PSFCH) resource/sequence for Hybrid Automatic Repeat Request (HARQ) reporting with regard to the SL communication. The procedure provides instructions for a step-wise determination of the PSFCH resource/sequence for the HARQ reporting based on a first and second characteristic with regard to the SL communication.

18 Claims, 13 Drawing Sheets

Related U.S. Application Data

(60) Provisional application No. 62/930,065, filed on Nov. 4, 2019.

(51) Int. Cl.
  *H04L 5/00* (2006.01)
  *H04L 27/26* (2006.01)
  *H04W 72/0446* (2023.01)
  *H04W 72/0453* (2023.01)

(52) U.S. Cl.
  CPC ..... *H04L 27/2607* (2013.01); *H04W 72/0446* (2013.01); *H04W 72/0453* (2013.01)

(56) References Cited

U.S. PATENT DOCUMENTS

| | | | |
|---|---|---|---|
| 2019/0159194 A1 | 5/2019 | Huang et al. | |
| 2019/0261361 A1 | 8/2019 | Xiong et al. | |
| 2022/0094481 A1* | 3/2022 | Hong | H04L 1/1812 |
| 2022/0131647 A1* | 4/2022 | Hwang | H04L 1/1812 |
| 2022/0150871 A1* | 5/2022 | Luo | H04L 1/1861 |
| 2022/0337349 A1* | 10/2022 | Lee | H04L 1/1854 |

FOREIGN PATENT DOCUMENTS

| | | |
|---|---|---|
| CN | 110311762 A | 10/2019 |
| CN | 110313141 A | 10/2019 |
| CN | 110383736 A | 10/2019 |
| WO | WO 2018/137129 A1 | 8/2018 |
| WO | WO 2019/197025 A1 | 10/2019 |
| WO | WO 2020/033704 A1 | 2/2020 |
| WO | WO 2020/145684 A1 | 7/2020 |
| WO | WO 2020/210333 A1 | 10/2020 |
| WO | WO 2020/222568 A1 | 11/2020 |
| WO | WO 2021/006500 A1 | 1/2021 |
| WO | WO 2021/029722 A1 | 2/2021 |
| WO | WO 2021/067125 A1 | 4/2021 |
| WO | WO 2021/088810 A1 | 5/2021 |

OTHER PUBLICATIONS

Author Unknown, PHY layer procedures for NR sidelink, Doc. No. R1-1910538, pp. 1-14, Oct. 20, 2019.*
Author Unknown, Sidelink physical layer procedures for NR V2X communication, Doc. No. R1-1910653, pp. 1-19, Oct. 20, 2019.*
Author Unknown, Physical layer procedures for sidelink, Doc. No. R1-1911070, pp. 1-16, Oct. 20, 2019.*
EP Examination Report of European Patent Application No. 20885109.7, dated Mar. 10, 2023.
Examination Search Report issued in European Patent Application No. 20885109.7, dated Sep. 7, 2023.
Extended European Search Report for European Patent Application No. 20885109.7-1213 / 4023010 PCT/CN2020126194, dated Aug. 5, 2022.
First Examination Report of Indian Patent Application No. 202217019850, dated Aug. 29, 2022.
LG Electronics, R1-1901439, Feature lead summary for agenda item 7.2.4.1.2 Physical layer procedures, 3GPP TSG RAN WG1 Ad-Hoc Meeting 1901, Taipei, Taiwan, Jan. 21-25, 2019.
ASUSTeK, R1-1904680, Discussion on sidelink physical layer procedure on NR V2X, 3GPP TSG RAN WG1 #96bis, Xi'an, China, Apr. 8-12, 2019.
NTT DOCOMO, INC., R1-1905425, NR Sidelink Physical Layer Procedure, 3GPP TSG RAN WG1 #96bis, Xi'an, China, Apr. 8-12, 2019.
English language translation of International Search Report for PCT/CN2020/126194, mailed from China National Intellectual Property Administration on Jan. 19, 2021.
Fujitsu, Discussion on physical layer procedure for NR V2X, R1-1910139, 3GPP TSG RAN WG1 #98bis, Chongqing, China, Oct. 14-20, 2019.
CMCC, Discussion on HARQ feedback for NR V2X, R1-1910164, 3GPP TSG RAN WG1 #98 bis, Chongqing, China, Oct. 14-20, 2019.
Vivo, Physical layer procedure for NR sidelink, R1-1910217, 3GPP TSG RAN WG1 Meeting #98bis, Chongqing, China, Oct. 14-20, 2019.
ZTE, Sanechips, Discussion on PHY procedures for sidelink, R1-1910299, 3GPP TSG RAN WG1 #98bis, Chongqing, China, Oct. 14-20, 2019.
CATT, Physical layer structure for NR sidelink, R1-1910327, 3GPP TSG RAN WG1 Meeting #98bis, Chongqing, China, Oct. 14-20, 2019.
Ericsson, PHY layer structure for NR sidelink, R1-1910532, 3GPP TSG-RAN WG1 Meeting #98bis, Chongqing, China, Oct. 14-20 2019.
LG Electronics, Discussion on physical layer procedures for NR sidelink, R1-1910783, 3GPP TSG RAN WG1 Meeting #98bis, Chongqing, China, Oct. 14-20, 2019.
ITL, Physical layer procedure for NR V2X, R1-1910797, 3GPP TSG RAN WG1 #98bis, Chongqing, China, Oct. 14-20, 2019.
Examination Search Report issued in Canadian Patent Application No. 3154570, dated Jun. 12, 2023.
First Office Action issued in Chinese Patent Application No. 202210306879.7, dated Jun. 2, 2023.
Notice of Deficiencies dated May 5, 2024 for Israeli Application No. 292110.
Communication pursuant to Article 94(3) EPC dated Mar. 4, 2024 for European Application No. 20885109.7.
Japanese Office Action in Patent Application No. 2022-524271 Notice of Reasons for Refusal Issued on Nov. 1, 2024.

* cited by examiner

FEEDBACK CHANNEL MAPPING AND MULTIPLEXING HARQ REPORTS IN NR SIDELINK COMMUNICATION

CROSS-REFERENCE TO RELATED APPLICATION

The present application is a continuation application of International Application No. PCT/CN2020/126194, filed on Nov. 3, 2020, which claims the priority to U.S. provisional application 62/930,065, filed on Nov. 4, 2019. The present application claims priority and the benefit of the above-identified applications and the above-identified applications are incorporated by reference herein in their entireties.

TECHNICAL FIELD

The present disclosure relates to the field of Sidelink (SL) communication. In particular, the present disclosure relates to methods and apparatus for feedback channel mapping and multiplexing HARQ reports in New Radio (NR) SL communication.

BACKGROUND

In the development of direct device-to-device (D2D) communication under the 3rd generation partnership project (3GPP), also called Sidelink (SL) technology, the reliability requirement to successfully deliver safety related message packets for advanced driving use cases over the direct radio link, i.e. the SL link, is extremely high, e.g. up to 99.999%. In order to meet this stringent reliability radio requirement, the next generation of SL technology, which is to be based on the latest 5G new radio (NR) standards, newly incorporates a Hybrid Automatic Repeat Request (HARQ) feature, like HARQ signaling, to improve not just the reliability part of the direct radio link but also to shorten the latency part of packet transport blocks (TBs) delivery and to minimize the overall usage of SL resources at the same time.

Acknowledgement signaling processes like HARQ signaling are widely used in wireless communication technology (telecommunications) to facilitate low error rates when transferring data between, for example, a network node, like a base station, and a user equipment (UE). Now, acknowledgement signaling should also be used for SL communication when transferring data directly between UEs without the interference of a network node. The acknowledgment signaling processes may determine correct or incorrect reception of packet TBs over SL based on coding bits associated to the packet TBs. HARQ signaling may be referred to HARQ feedback or HARQ feedback reporting, wherein HARQ feedback reports may be transmitted from one UE to another UE using SL communication. For the HARQ signaling, a HARQ codebook may be used which associates a bit pattern to acknowledgement signaling, e.g. by defining and/or indicating the bit pattern to be used for acknowledgment signaling.

For D2D communication, this means that HARQ feedback reporting may be performed by a UE receiving a packet TB (Rx-UE), the packet TB being transmitted from another UE (Tx-UE) to the Rx-UE. In other words, for D2D communication, HARQ feedback reports may be sent directly from the Rx-UE to the Tx-UE via SL, the HARQ feedback reports including feedback information, like Acknowledgment (ACK) and/or Negative Acknowledgment (NACK) information, regarding the received packet TB. The ACK information in a HARQ feedback report may indicate, to the Tx-UE, that the corresponding packet TB was successfully received and decoded by the Rx-UE, wherein the NACK information in a HARQ feedback report may indicate, to the Tx-UE, that the Rx-UE did not successfully receive and/or decode the corresponding packet TB. Reasons for not successfully receiving and/or decoding packet TBs may be, for example, errors occurring during the packet TB transmission or during encoding and/or decoding processes.

When the Tx-UE receives a HARQ feedback report comprising NACK information, the Tx-UE may retransmit the respective packet TB for which NACK information has been received. By retransmitting the respective packet TB, the Rx-UE may be able to successfully receive and decode the packet TB, resulting in increased reliability.

In addition, by only retransmitting the respective packet TBs for which NACK information has been received by the Tx-UE and by not retransmitting the packet TBs for which ACK information has been received by the Tx-UE, the latency part of packet TBs delivery can be shortened and the overall usage of SL resources can be minimized.

However, it is expected that the new HARQ feedback reporting for D2D communication over the SL will not be applicable and useful in all communication scenarios. That is, HARQ reporting may only be used for three specific SL communication cast types, like unicast (UC) for one-to-one direct communication, connection-less groupcast (CL-GC) with unknown number of Rx-UE(s) within a short communication range that can communicate with each other using SL communication, and connection-oriented groupcast (CO-GC) with a fixed or deterministic number of Rx-UEs within a SL group that can communicate with each other using SL communication.

To facilitate the feedback of HARQ reports, a new Physical Sidelink Feedback Channel (PSFCH) is introduced in NR SL design for Rx-UE(s) to feedback ACK and/or NACK results to the Tx-UE. Based on the expected usage of NR SL, where unicast and groupcast communications may not be the only and dominant transmission cast types, the periodicity of PSFCH occurrence (N) in terms of number of time slots within a resource pool may be 0 (no PSFCH at all), 1, 2, or 4. Due to UE processing capability constraint, it is also expected that there may be a minimum time gap (K) between a Physical Sidelink Shared Channel (PSSCH) transmission comprising the transmission of packet TBs and its associated PSFCH for HARQ feedback. For example, a minimum time gap between the PSSCH transmission and the PSFCH transmission is two slots. This means the quickest time a Rx-UE can send its HARQ report after receiving a packet TB during PSSCH transmission from a Tx-UE in the above described three specific SL communication cast types is two slots.

FIG. 1 shows an example for HARQ reporting with regard to PSSCH transmission and PSFCH transmission, when N=1 and K=2. The frequency (Freq.) axis is in the vertical direction and the time axis is in the horizontal direction, the frequency axis comprising sub-channels of, for example, 10 Resource Blocks (RBs) each and the time axis comprising a plurality of time slots. In one time slot, one PSSCH slot and one PSFCH slot are present, wherein some time resources are allocated for PSSCH transmission in the PSSCH slot and some time resources are allocated for PSFCH transmission in the PSFCH slot. In addition, in one sub-channel, some RBs are allocated for PSSCH transmission and some RBs are allocated for PSFCH transmission. A HARQ reporting window (HRW) is indicated with dashed lines. The size of the HRW is indicated with the parameter N, wherein, in this example, N is set to one (N=1). This means, that the HRW comprises one PSSCH slot and that a PSFCH slot carries a HARQ feedback report for one PSSCH slot. Here, the minimum time gap is K=2. Thus, a Rx-UE must wait two PSSCH slots after having received a packet TB in a PSSCH slot in order to transmit a HARQ feedback report for this packet TB in a PSFCH slot. The PSFCH time resources in the time slots and RBs for PSFCH transmission in FIG. 1 are illustrated with a diamond pattern.

FIG. 2 shows another example for HARQ reporting with regard to PSSCH transmission and PSFCH transmission, when N=2 and K=2. The same scenario as in FIG. 1 is shown, except for a different HRW. Due to N=2, the HRW comprises two PSSCH slots and thus a PSFCH slot carries HARQ feedback reports for two PSSCH slots. For example, for PSSCH transmissions in time slots (n−3) and (n−2), the corresponding PSFCH transmission opportunity for carrying the HARQ feedback reports is in time slot (n) in order to satisfy the K=2 constraint, i.e. the minimum time gap of K=2. As such, multiplexing of HARQ feedback reports for multiple PSSCH transmission slots is necessary when N>1.

FIG. 3 shows another example for HARQ reporting with regard to PSSCH transmission and PSFCH transmission, when N=4 and K=2. The same scenario as in FIGS. 1 and 2 is shown, except for a different HRW. Due to N=4, the HRW comprises four PSSCH slots and thus a PSFCH slot carries HARQ feedback reports for four PSSCH slots. For example, for PSSCH transmissions in time slots (n−5), (n−4), (n−3), and (n−2), the corresponding PSFCH transmission opportunity for carrying the HARQ feedback reports is in time slot (n) in order to satisfy the K=2 constraint, i.e. the minimum time gap of K=2. Again, multiplexing of HARQ feedback reports for multiple PSSCH transmission slots is necessary when N>1.

SUMMARY

Technical Problem

As described above, HARQ feedback reporting is newly introduced for NR SL communication between UEs, e.g. between a Tx-UE and a Rx-UE, wherein a new physical channel, the PSFCH, is introduced for HARQ feedback reporting with regard to PSSCH transmission. As explained with regard to FIGS. 2 and 3, multiplexing of HARQ feedback reports for multiple PSSCH transmission slots is necessary when N>1.

However, so far, no rules have been provided how to determine a PSFCH resource in a sub-channel for PSFCH transmission. No PSFCH mapping and ACK/NACK multiplexing rules have been defined so far.

Therefore, one of the main issues associated with PSFCH design is the ability to multiplex and the resource capacity to accommodate HARQ reports for different cast types of SL transmission, multiple time slots and multiple UEs per PSSCH transmission/time slot.

Solution

According to an aspect, a method of operating a user equipment (UE) performing Sidelink (SL) communication, comprises providing a procedure to the UE, the procedure allowing the UE to determine a Physical Sidelink Feedback Channel (PSFCH) resource/sequence for Hybrid Automatic Repeat Request (HARQ) reporting with regard to the SL communication, wherein the procedure provides instructions for a step-wise determination of the PSFCH resource/sequence for the HARQ reporting based on a first and second characteristic with regard to the SL communication.

According to another aspect, a user equipment (UE) comprises a processor and memory, said memory containing instructions executable by said processor, whereby said UE is operative to provide a procedure to the UE, the procedure allowing the UE to determine a Physical Sidelink Feedback Channel (PSFCH) resource/sequence for Hybrid Automatic Repeat Request (HARQ) reporting with regard to the SL communication, wherein the procedure provides instructions for a step-wise determination of the PSFCH resource/sequence for the HARQ reporting based on a first and second characteristic with regard to the SL communication.

DETAILED DESCRIPTION

The mechanism(s) described above and in more detail below solve technical problems that arise with regard to the newly introduced PSFCH for NR SL communication.

As explained above, so far, no rules have been provided how to determine a PSFCH resource/sequence (PSFCH resource or PSFCH sequence) in a sub-channel for PSFCH transmission. In addition, no PSFCH mapping and ACK/NACK multiplexing rules have been defined so far. Therefore, one of the main issues associated with PSFCH design is the ability to multiplex and the resource capacity to accommodate HARQ reports for different cast types of SL transmission, multiple slots and multiple UEs per PSSCH transmission/slot.

Solutions how to determine a PSFCH resource/sequence in a sub-channel for PSFCH transmission with regard to SL communication are detailed below. For example, for the feedback channel mapping and multiplexing of HARQ reports schemes for a sidelink packet TB receiving UE (Rx-UE) sending ACK/NACK feedback to the packet TB transmitting UE (Tx-UE), it is aimed to resolve the above described PSFCH capacity and multiplexing issues by adjusting the amount of PSFCH radio resources based on demand and by controlling the slots in which a transmission cast type with large amount of ACK/NACK feedback can be transmitted, wherein increase in control signaling should be avoided. In addition, it is aimed to efficiently utilize all PSFCH resources/sequences. In order to accommodate multiple HARQ reports from different UEs and for different PSSCH transmission slots on a limited set of resource blocks (RBs) for PSFCH, a technique of cyclic shifting of PSFCH resources/sequences may be utilized.

In the following, any exemplary type of wireless communication network, cellular wireless communication network, or the like is regarded, wherein the communication network may comprise at least one network node and at least one user equipment (UE).

Figure 4:
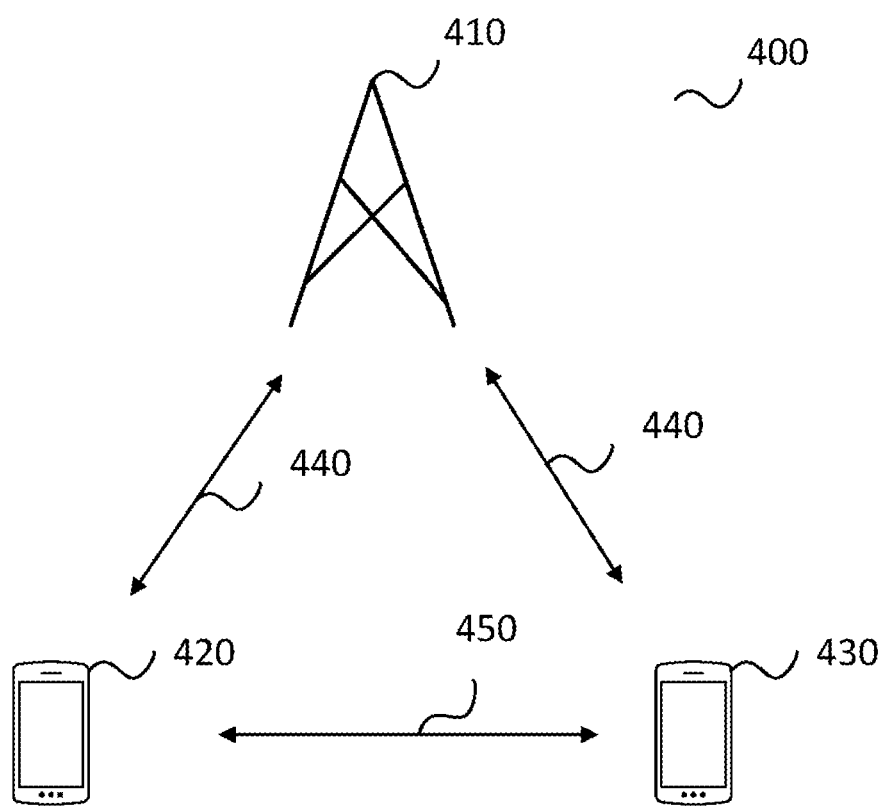
FIG. 4 shows an example of a wireless communication network.

FIG. 4 shows an example of a wireless communication network 400 comprising one network node 410, a UE 420, and a UE 430. A network node and a UE may generally be considered a device or node adapted for wireless and/or radio (and/or microwave) frequency communication, and/or for communication utilizing an air interface, e.g. according to a communication standard. The network node 410 may be any kind of network device or radio node of a wireless communication network, such as a base station and/or eNodeB (eNB) and/or gNodeB (gNB) and/or relay node and/or micro or nano or pico or femto node and/or other node. The exemplary wireless communication network 400 of FIG. 4 comprises one network node and two UEs. This is, however, not limiting and the wireless communication network 400 may comprise more or less network nodes and UEs.

The UEs 420 and 430 may represent an end device for communication utilizing the wireless communication network, and/or be implemented as a UE according to a communication standard such as LTE, NR or the like. Examples of UEs may comprise a phone such as a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), D2D (Device-to-Device), a RSU (Road Side Unit), or a vehicle adapted for wireless communication. A UE or terminal may be mobile or stationary.

The network node 410 is able to send any kind of Downlink (DL) data to the UEs 420 and 430 via communication links 440 and the UEs 420 and 430 are able to send any kind of Uplink (UL) data to the network node 410 via communication links 440 (such as LTE, NR or the like). Furthermore, the UEs 420 and 430 may directly exchange data between each other using Sideling (SL) signaling via communication link 450 (such as Bluetooth, Wi-Fi or the like). SL communication is used to support direct communication between the UEs 420 and 430 without the interference of the network node 410. SL communication may be used to operate the UEs 420 and 430 in several modes, like D2D, MTC, etc.

D2D communication in combination with cellular network leads to the advantages of support of both direct communications between the UEs and traditional cellular-network based communication and provides migration path to, for example, 5G based systems and services.

Resources assigned to the SL may be taken from the Uplink (UL), i.e. from the subframes on the UL frequency in Frequency Division Duplex (FDD) or in Time Division Duplex (TDD). UL or SL signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto.

Signaling may generally comprise one or more signals and/or one or more symbols. Control information or a control information message or corresponding signaling (control signaling) may be transmitted on a control channel, e.g. a physical control channel, which may be a downlink channel or a sidelink channel in some cases, e.g. one UE scheduling another UE. Acknowledgement signaling, e.g. as a form of HARQ feedback reporting, may be transmitted by a UE 420 or 430 on a PUCCH (Physical Uplink Control Channel) and/or PUSCH (Physical Uplink Shared Channel) and/or a HARQ-specific channel to the network node 410. Acknowledgement signaling, e.g. as the form of HARQ feedback reporting, may also be transmitted by one of the UEs 420 and 430 on a Physical Sidelink Feedback Channel (PSFCH) to the other of the UEs 420 and 430. For example, if the UE 420 sends packet TBs to the UE 430 using Physical Sidelink Shared Channel (PSSCH) transmission via SL 450 (UE 420 being also referred to as transmitting UE (Tx-UE)), the UE 430 as receiving UE (Rx-UE) may send back HARQ feedback reporting to the UE 420, the HARQ feedback reporting comprising Acknowledgement (ACK) or Negative Acknowledgement (NACK) information regarding the transmitted packet TBs. The ACK information may indicate that the UE 430 was able to successfully receive and decode the corresponding packet TBs, while the NACK information may indicate that the UE 430 was not able to successfully receive and/or decode the corresponding packet TBs. When the UE 420 receives NACK information regarding a specific packet TB, the UE 420 may reseed the specific packet TB to allow the UE 430 to successfully receive and decode the packet TB. By doing so, the transmission reliability is increased.

Figure 5:
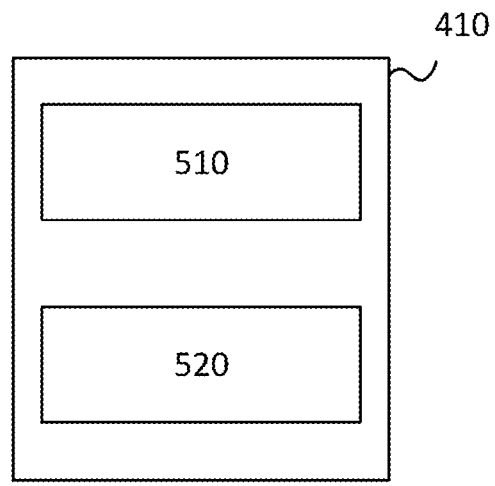
FIG. 5 shows an exemplary configuration for a network node.

FIG. 5 shows an exemplary configuration for the network node 410. The network node 410 may comprise a processor 510 and a memory 520. The processor 510 may be a processing circuitry (which may also be referred to as control circuitry) which may comprise a controller connected to the memory 520. Any module of the network node 410, e.g. a communication module or determining module, may be implemented in and/or executable by, the processing circuitry 510, in particular as module in the controller. The network node 410 may also comprise radio circuitry (not shown) providing receiving and transmitting or transceiving functionality, e.g. one or more transmitters and/or receivers and/or transceivers, wherein the radio circuitry is connected or connectable to the processing circuitry 510. An antenna circuitry (not shown) of the network node 410 may be connected or connectable to the radio circuitry to collect or send and/or amplify signals. The network node 410 may be adapted to carry out any of the methods for operating the network node disclosed herein; in particular, it may comprise corresponding circuitry, e.g. processing circuitry, and/or modules.

Figure 6:
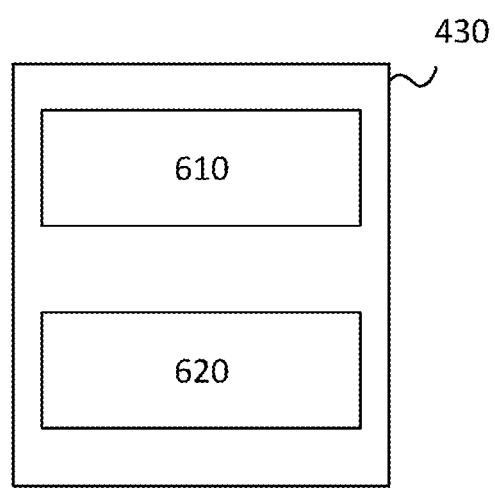
FIG. 6 shows an exemplary configuration for a user equipment.

FIG. 6 shows an exemplary configuration for the UE 430, the UE being, for example, the Rx-UE. The configuration for the UE 420 is the same as for UE 430 and a detailed description about the configuration for the UE 420 is here omitted for conciseness reasons. The UE 430 may comprise a processor 610 and a memory 620. The processor 610 may be a processing circuitry (which may also be referred to as control circuitry) which may comprise a controller connected to the memory 620. Any module of the UE 430, e.g. a communication module or determining module, may be implemented in and/or executable by, the processing circuitry 610, in particular as module in the controller. The UE 430 may also comprise radio circuitry (not shown) providing receiving and transmitting or transceiving functionality, e.g. one or more transmitters and/or receivers and/or transceivers, wherein the radio circuitry is connected or connectable to the processing circuitry 610. An antenna circuitry (not shown) of the UE 430 may be connected or connectable to the radio circuitry to collect or send and/or amplify signals. The UE 430 may be adapted to carry out any of the methods for operating the user equipment disclosed herein; in particular, it may comprise corresponding circuitry, e.g. processing circuitry, and/or modules.

There is generally considered a computer program product comprising instructions adapted for causing processing and/or control circuitry to carry out and/or control any method described herein, in particular when executed on the processing and/or control circuitry. Also, there is considered a carrier medium arrangement carrying and/or storing a computer program product as described herein.

A carrier medium arrangement may comprise one or more carrier media. Generally, a carrier medium may be accessible and/or readable and/or receivable by processing or control circuitry. Storing data and/or a computer program product and/or code may be seen as part of carrying data and/or a program product and/or code. A carrier medium generally may comprise a guiding or transporting medium and/or a storage medium. A guiding or transporting medium may be adapted to carry and/or store signals, in particular electromagnetic signals and/or electric signals and/or magnetic signals and/or optical signals. A carrier medium, in particular a guiding or transporting medium, may be adapted to guide such signals to carry them. A carrier medium, in particular a guiding or transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

Figure 7:
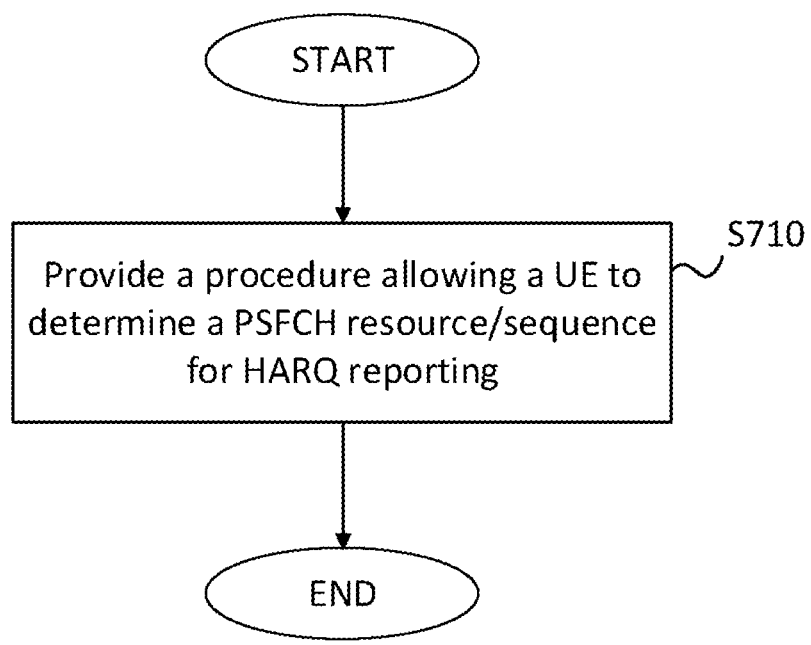
FIG. 7 shows a method of operating a user equipment, the user equipment performing Sidelink communication.

As already explained above, up until now, no rules how to determine a PSFCH resource for PSFCH transmission and no PSFCH mapping and ACK/NACK multiplexing rules have been defined so far Thus, in order to enable proper PSFCH resource determination, PSFCH mapping, and ACK/NACK multiplexing, FIG. 7 shows a method of operating a UE, for example UE 420 or UE 430, the UE performing SL communication.

As shown in FIG. 7, the method comprises providing (S710) a procedure to the UE, the procedure allowing the UE to determine a PSFCH resource/sequence for HARQ reporting with regard to the SL communication. Here, the procedure provides instructions for a step-wise determination of the PSFCH resource/sequence for the HARQ reporting based on a first and second characteristic with regard to the SL communication. The UE may be the Rx-UE receiving a packet TB from the Tx-UE via SL communication and requested to perform HARQ reporting to the Tx-UE with regard to the received packet TB. The procedure may comprise a set of rules allowing the UE to autonomously determine the PSFCH resource/sequence.

For example, the Rx-UE can be indicated by an SCI (Sidelink Control Information) format scheduling a SL communication, in particular a PSSCH reception, to transmit the HARQ reporting or a PSFCH with HARQ-ACK information in response to the SL communication. The Rx-UE may provide HARQ-ACK information or HARQ reporting including ACK or NACK, or only NACK. The SCI format may comprise a HARQ feedback enabled/disabled indicator field, wherein the HARQ reporting or PSFCH with HARQ-ACK information is transmitted by the Rx-UE in response to the SL communication, in particular the PSSCH reception, when the HARQ feedback enabled/disabled indicator has a specific value. If, for example, the Rx-UE receives a PSSCH in a resource pool and the HARQ feedback enabled/disabled indicator field in an associated SCI format, for example SCI format 2-A or 2-B, has the value 1, the Rx-UE provides the HARQ-ACK information or HARQ reporting in a PSFCH transmission in the resource pool.

Determining or autonomously determining a PSFCH resource/sequence may mean that the UE is able to determine the PSFCH resource/sequence without receiving control signaling or configuration information from, for example, a network node, like a base station, or another UE. The UE is able to determine the PSFCH resource/sequence solely by regarding the characteristics of the SL communication. Thus, by defining implicit PSFCH mapping and ACK/NACK multiplexing rules, it eliminates the need for the Tx-UE or Rx-UE to indicate or inform, in the control signaling, the other UE the exact location and PSFCH resources/sequences to use for feeding back HARQ reports. Therefore, the amount of control signaling overhead can be reduced.

Figure 8:
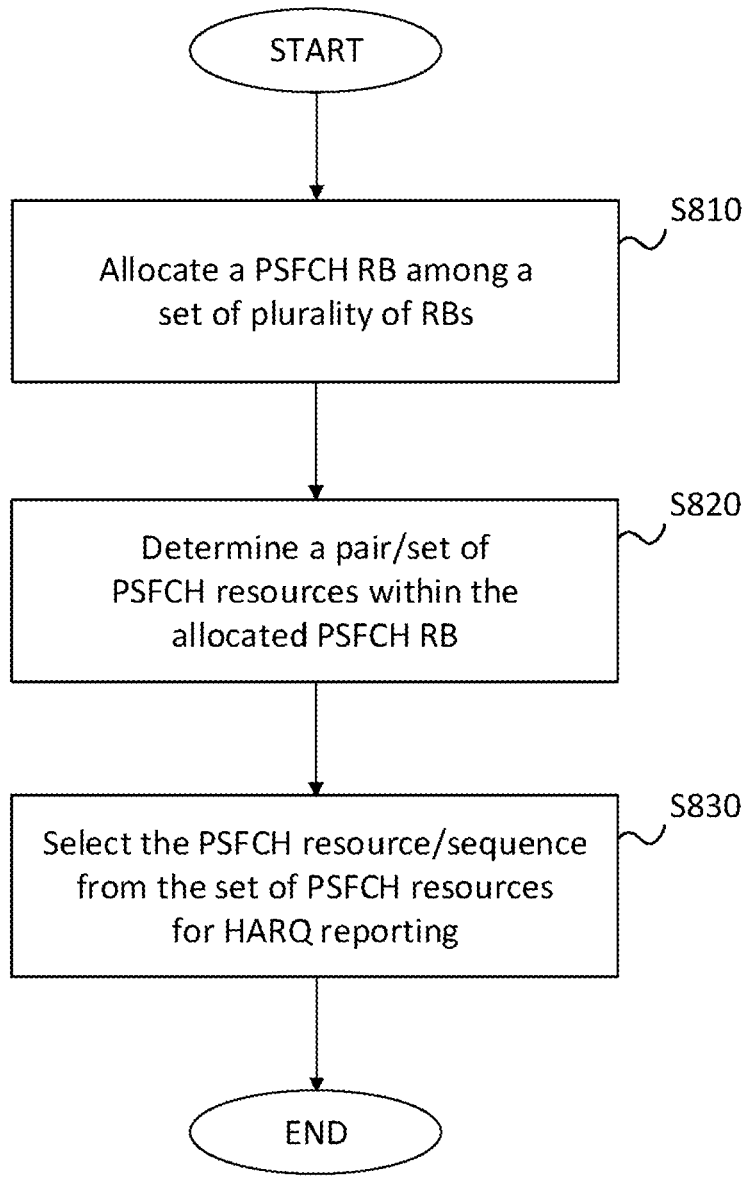
FIG. 8 shows a flowchart for step-wise determination instructions according to an implementation.

FIG. 8 shows a flowchart for step-wise determination instructions according to an implementation. The instructions for the step-wise determination may comprise allocating (810), as a first step, a PSFCH RB among a set of plurality of RBs based on the first characteristic with regard to the SL communication.

The instructions for the step-wise determination may further comprise determining (S820), as a second step, a pair/set of PSFCH resources within the allocated PSFCH RB based on the second characteristic with regard to the SL communication, and selecting (S830), as a third step, the PSFCH resource/sequence (PSFCH resource or PSFCH sequence) from the pair/set of PSFCH resources for HARQ reporting based on an ACK or NACK decoding result of a PSSCH packet TB received during the SL communication. The PSSCH packet TB may be a packet TB transmitted from the Tx-UE to the Rx-UE during a PSSCH slot using SL communication. The ACK and NACK decoding results may indicate whether the Rx-UE has successfully received and decoded the PSSCH packet TB. If the Rx-UE is able to successfully receive and decode the PSSCH packet TB, the PSFCH resource/sequence is selected based on the ACK decoding result. If the Rx-UE is not able to successfully receive and/or decode the PSSCH packet TB, the PSFCH resource/sequence is selected based on the NACK decoding result. In other words, a pair/set of PSFCH resources/sequences within the allocated PSFCH RB may refer to one PSFCH resource/sequence allocated for an ACK decoding result and another PSFCH resource/sequence allocated for a NACK decoding result. There may be a pair of PSFCH resources with a cyclic shift of 6.

According to another implementation, the method of operating the UE may further comprise transmitting the ACK or NACK decoding result for the HARQ reporting using the PSFCH resource/sequence that has been selected.

For example, the UE receives, as a Rx-UE, at least one PSSCH packet TB from a further UE, i.e. a Tx-UE, via the SL communication, wherein the Rx-UE is requested a HARQ report of ACK and/or NACK feedback by the Tx-UE regarding the at least one PSSCH packet TB. As described above, the Rx-UE may select a PSFCH resource/sequence for transmitting the HARQ report based on the characteristics of the SL communication, the HARQ report comprising ACK and/or NACK decoding results regarding the at least one PSSCH packet TB. Depending on the HARQ reporting window (HRW) indicated by the parameter N, the HARQ report transmitted in one PSFCH slot may comprise ACK and/or NACK decoding results of packet TBs transmitted in N PSSCH slots. Thus, the HRW, in particular the parameter N of the HRW, indicates the number of PSSCH slots that should be reported in the HARQ report transmitted in a PSFCH slot. The Rx-UE may transmit the ACK and/or NACK decoding results using the HARQ report to the Tx-UE for acknowledgement feedback with regard to the received PSSCH packet TB(s).

Figure 1:
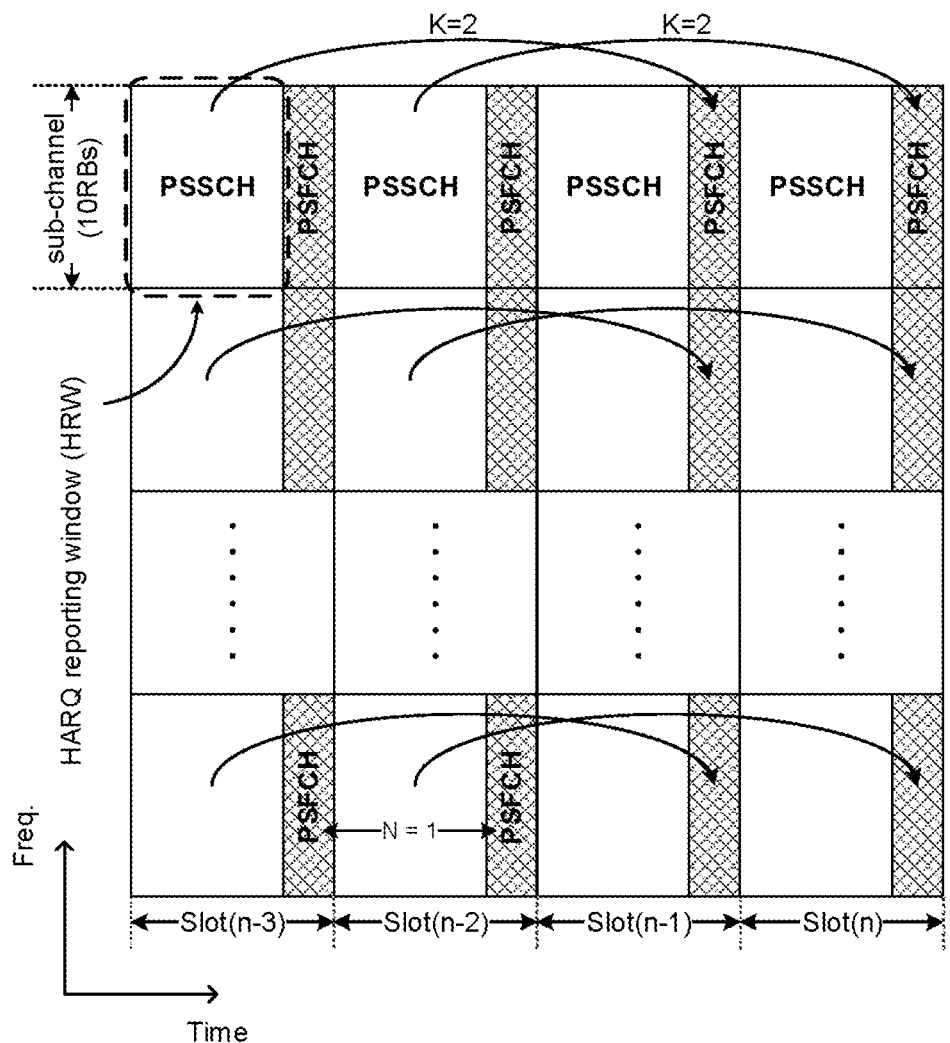
FIG. 1 shows an example for HARQ reporting with regard to PSSCH transmission and PSFCH transmission, when N=1 and K=2.
Figure 2:
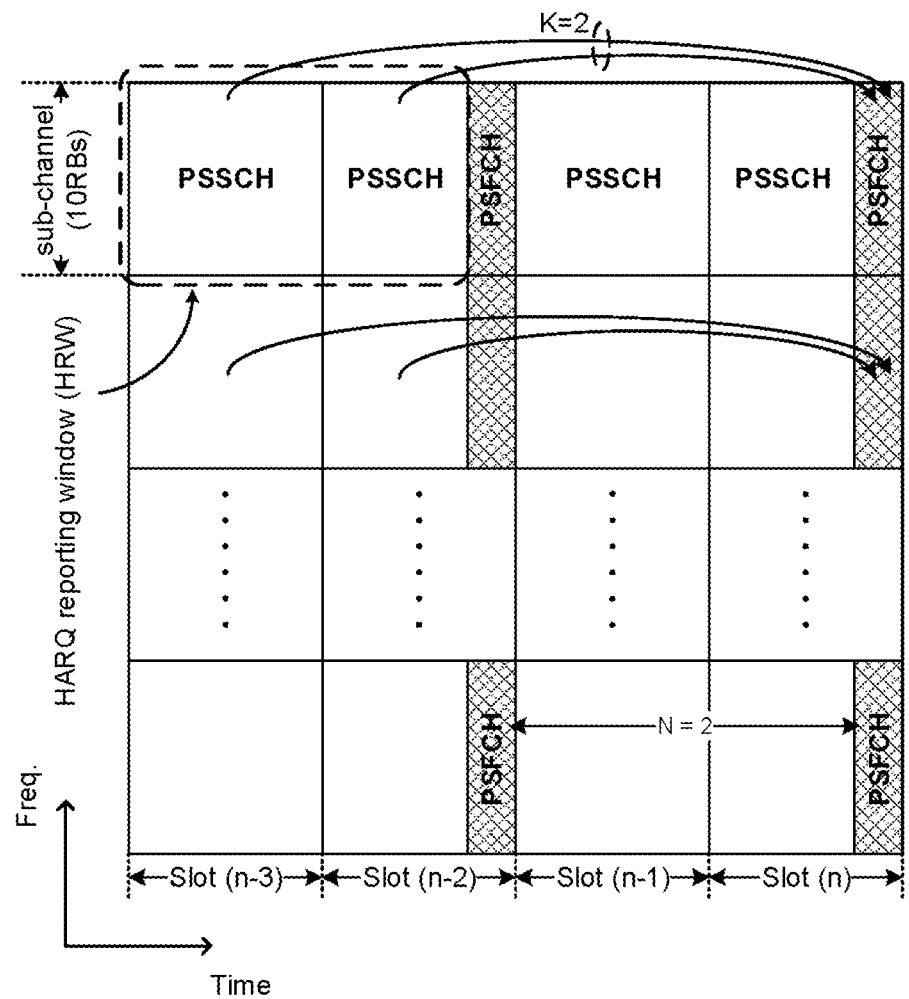
FIG. 2 shows another example for HARQ reporting with regard to PSSCH transmission and PSFCH transmission, when N=2 and K=2.
Figure 3:
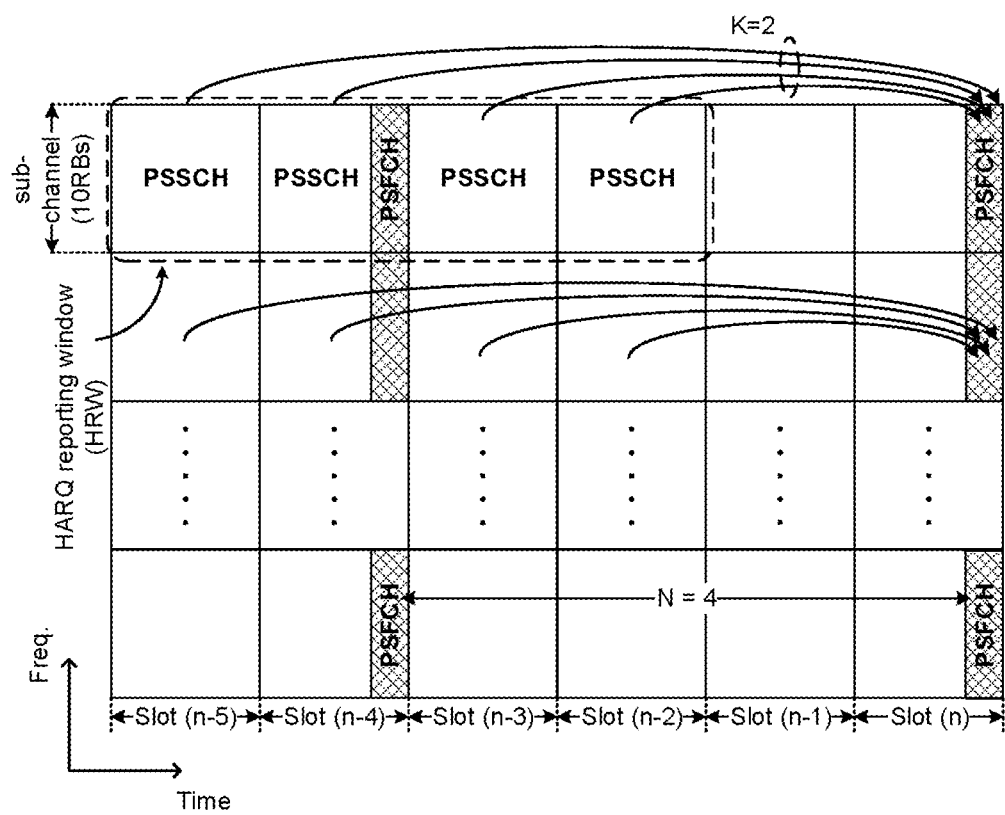
FIG. 3 shows an example for HARQ reporting with regard to PSSCH transmission and PSFCH transmission, when N=4 and K=2.
Figure 9:
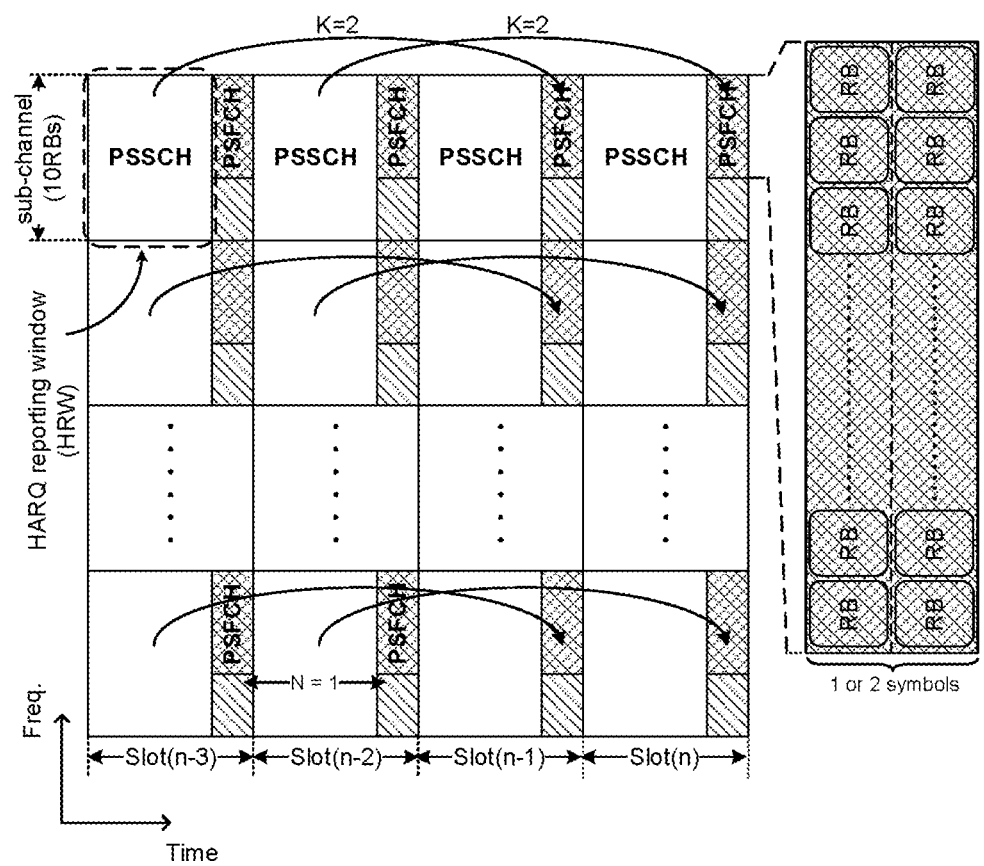
FIG. 9 shows a configuration of PSSCH and PSFCH resources.

FIG. 9 shows a configuration of PSSCH and PSFCH resources. Again, as also explained with regard to FIGS. 1 to 3, the frequency axis is in the vertical direction, wherein a number of sub-channels with 10 RBs is arranged in the frequency direction, and the time axis is in the horizontal direction, wherein a number of time slots is arranged in the time direction. In each time slot, for example (n−3), (n−2), (n−1), and (n), one PSSCH slot and one PSFCH slot are present, wherein some time resources and frequency resources are allocated for PSSCH transmission in the PSSCH slot and some time resources and frequency resources are allocated for PSFCH transmission in the PSFCH slot. Here, the HRW is again indicated with dashed lines, wherein N=1. This means, that the HRW comprises one PSSCH slot and that a PSFCH slot carries a HARQ feedback report for one PSSCH slot. The minimum time gap is K=2 which means that the Rx-UE must wait two PSSCH slots after having received a packet TB in a PSSCH slot in order to transmit a HARQ feedback report for this packet TB in a PSFCH slot. The PSFCH time resources in the time slots and RBs as frequency resources for PSFCH transmission are illustrated with a diamond pattern in FIG. 9. The time and frequency resources being illustrated with downward diagonal lines in FIG. 9 are used for other purposes than PSFCH transmission not specified further.

FIG. 9 further shows the RBs for one PSFCH slot. One PSFCH slot may be for one or two PSFCH symbols, wherein a plurality of RBs are used for one symbol. When the sub-channel comprises, for example, 10 RBs, one PSFCH slot may comprise 10 RBs or less depending on how many RBs in one time slot are used for other purposes than PSFCH transmission not specified further.

As described above, a PSFCH RB is allocated among a set of plurality of RBs in order to select a PSFCH resource/sequence within the PSFCH RB. According to an implementation, the set of plurality of RBs may be configured for PSFCH transmission and reception, and represented as a bitmap. For example, when again referring to FIG. 9, a PSFCH RB is determined not among all RBs in the sub-channel but solely among the RBs configured for PSFCH transmission and reception, i.e. the RBs being indicated with diamond pattern. A network node may, for example, pre-configure the set of plurality of RBs in the sub-channel and may transmit configuration information to the UEs for configuring the set of plurality of RBs in the sub-channels.

According to an implementation, the set of plurality of RBs may be configured using SL resource pool configuration or SL resource pool pre-configuration, the SL resource pool configuration or pre-configuration comprising a PSFCH resource allocation and HARQ reporting related information. In particular, the SL resource pool configuration may comprise at least one PSFCH parameter related to time domain allocation, frequency domain allocation, cyclic shift allocation, and/or information about connection-oriented groupcast slots allocation. The UE may receive the SL resource pool configuration from a network node, for example using downlink data, or from pre-configuration. The SL resource pool pre-configuration may be pre-configured in the UE without the need of the UE to explicitly receive the configuration from a network node.

For example, for PSFCH mapping and multiplexing of HARQ reports in NR SL communication of a first transmitting UE (Tx-UE) sending a packet TB via PSSCH to at least one second UE receiving the packet TB (Rx-UE), the said both UEs receive SL resource pool configuration details from either network configuration or pre-configuration comprising PSFCH resources/sequences and HARQ reporting related information. Beside the time domain periodicity of PSFCH resource occurrence (N) within a resource pool and a minimum time gap (K) between a PSSCH transmission and its associated PSFCH for HARQ reporting, the said (pre-)configuration information may additionally include one or more of the following parameters: number of PSFCH symbols parameter, PSFCH starting symbol parameter, RB assignment parameter, cyclic shift pairs or offset index parameter, and connection-oriented groupcast slots parameter.

Thus, said (pre-)configuration information, i.e. the SL resource pool (pre-)configuration information, may comprise PSFCH parameters related to time domain allocation including the number of PSFCH symbols parameter, PSFCH starting symbol parameter, periodicity of PSFCH resources in a resource pool, and/or minimum time gap (K); the PSFCH parameters related to frequency domain allocation including the PSFCH RB assignment parameter; the cyclic shift allocation including a cyclic shift pairs or offset index parameter; and/or parameters related to the connection-oriented groupcast slots allocation.

Figure 10:
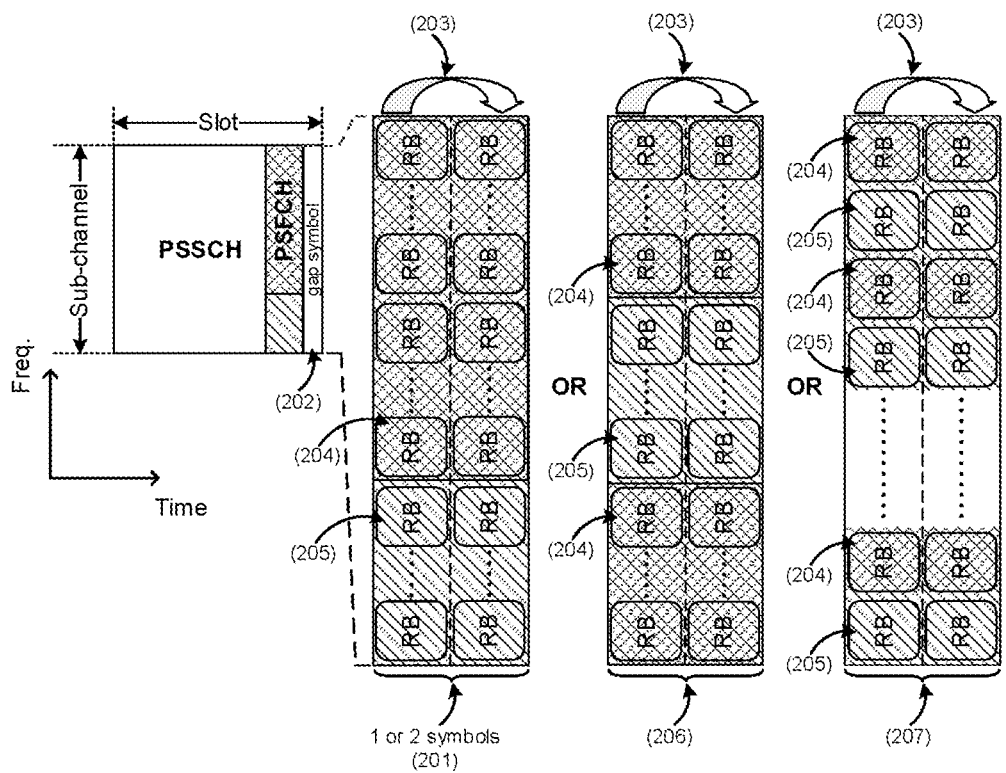
FIG. 10 shows the configuration of one sub-channel in the frequency domain.

The number of PSFCH symbols parameter may be of value one or two and may indicate the number of PSFCH symbols in a slot. In particular, the number of PSFCH symbols parameter may define one or two symbols allocated for PSFCH towards the end of a time slot for the Rx-UE to transmit its HARQ report. As can be exemplarily seen in FIG. 9, one or two symbols are allocated towards the end of each time slot (n−3), (n−2), (n−1), and (n). FIG. 10 further shows the exemplary configuration of one sub-channel, e.g. one sub-channel that has already been shown in FIG. 9. In reference to FIG. 10, a slot structure for PSFCH resources (pre-) configured towards the end of a slot is in the frequency direction, wherein the last symbol of the time slot is kept empty as a gap symbol (202) for the purpose of Tx/Rx switching and/or Sidelink/Uplink switching. FIG. 10 also illustrates the one or two symbols (201) defining the number of PSFCH symbols parameter.

The PSFCH starting symbol parameter may indicate a symbol index within a time slot from which the PSFCH symbol(s) are allocated. If there are, for example, 14 symbols in a slot, the symbol index may be from 0 to 13. If this parameter is (pre-)configured, the said both Rx-UE and Tx-UE follow this parameter for transmitting and receiving PSFCH, respectively. In the case when this parameter is not (pre-)configured, the starting symbol for PSFCH is to be determined based on the number of PSFCH symbols. For example, assuming there are 14 symbols in a time slot and the very last symbol is always designated as a gap symbol (see gap symbol (202) in FIG. 10) for Tx/Rx switching and/or Sidelink/Uplink switching. If the number of PSFCH symbols is determined to be two symbols by either (pre-)configuration or pre-defined/fixed, the starting symbol in this case will then be the 12th symbol (symbol index 11) in the time slot with the 14th symbol (symbol index 13) being the gap symbol. For the case that only one symbol is allocated for PSFCH, then the starting symbol will be the 13th symbol (symbol index 12) in a slot with again the 14th symbol (symbol index 13) being the gap symbol.

Additionally, when the SL resource pool configuration comprises the number of PSFCH symbols parameter as explained above, the number of PSFCH symbols parameter indicating the number of PSFCH symbols in a slot, and when the number of PSFCH symbols parameter indicates two PSFCH symbols in the slot being allocated for PSFCH, feedback information is encoded and mapped in one symbol and then duplicated to the immediately preceding symbol. In other words, when two Orthogonal Frequency Division Multiplexing (OFDM) symbols are allocated for PSFCH, the PSFCH resource/sequence is mapped in one symbol and then duplicated to the immediately preceding symbol. This process of copying over or duplicating the feedback information to the other symbol is shown in FIG. 10 with the arrows having the number (203). This means that a transmitted signal from a Rx-UE is identical in both symbols for a purpose of automatic gain control (AGC) and/or increased reliability at the Tx-UE when the two symbols are combined.

The granularity of PSFCH resource assignment may be one RB and the allocation of PSFCH RBs in a sub-channel does not need to be the same as the number of RBs within a sub-channel. This is also shown in FIGS. 9 and 10 where some RBs are used for PSFCH transmission and some other RBs are used for other purposes than PSFCH transmission, the RBs used for other purposes indicated with downward diagonal lines. Thus, the RB assignment parameter may define the exact RB location(s) for PSFCH transmission in a resource pool, wherein the RB assignment parameter can be represented as a bitmap. As shown in FIG. 10, RBs (204) configured for PSFCH transmission may be allocated contiguously (as shown for case (206) in FIG. 10) or non-contiguously (as shown for case (207) in FIG. 10) in the frequency domain for the purpose of also transmitting other possible signals or channels (205) not used for PSFCH transmission (see RBs indicated with downward diagonal lines in contrast to RBs used for PSFCH transmission indicated with diamond pattern). For example, the RBs in PSFCH symbols not assigned for PSFCH transmissions (205) may be allocated for transmitting a channel state information reference signal (CSI-RS) in a localized and/or wideband manner depending on the sub-channel size, positioning reference signal (PRS) for positioning and distance ranging purposes, and/or other PSFCH formats that may be introduced later for future compatibility.

The cyclic shift pairs or offset index parameter may be value from 1 to 6 or 0 to 11, respectively. The cyclic shift pairs may set the number of pairs of cyclic shift positions or sequences within a PSFCH RB that can be used for HARQ reporting. The cyclic shift offset index may set the initial cyclic shift sequence position or an offset to the cyclic shift position zero of a HARQ sequence or PSFCH resource within a PSFCH RB that a Rx-UE should use to represent an ACK or NACK decoding result. When the periodicity of PSFCH occurrence (N) in a resource pool is more than 1 (e.g. 2 or 4), the actual initial cyclic shift positions to be used for mapping ACK/NACK information may be further offset based on the PSSCH slot position within the HRW in which the packet TB(s) is received.

The parameters related to the connection-oriented groupcast slots allocation may indicate PSSCH slot position(s) in which connection-oriented groupcast TBs can be transmitted within the HRW. Connection-oriented groupcast TBs may be transmitted in a groupcast session where all UEs within a same SL group have knowledge about the group size of the SL group. The UEs within the SL group are able to communicate with each other using SL communication. This means that all UEs within the same SL group may know the other UEs within the same SL group and may communicate with them using SL communication. The parameters related to connection-oriented groupcast slots allocation may be represented using a bitmap having the same size as the number of PSSCH slots within the HRW. That is, the bitmap size may be two bits when N=2 or four bits when N=4.

Figure 11A:
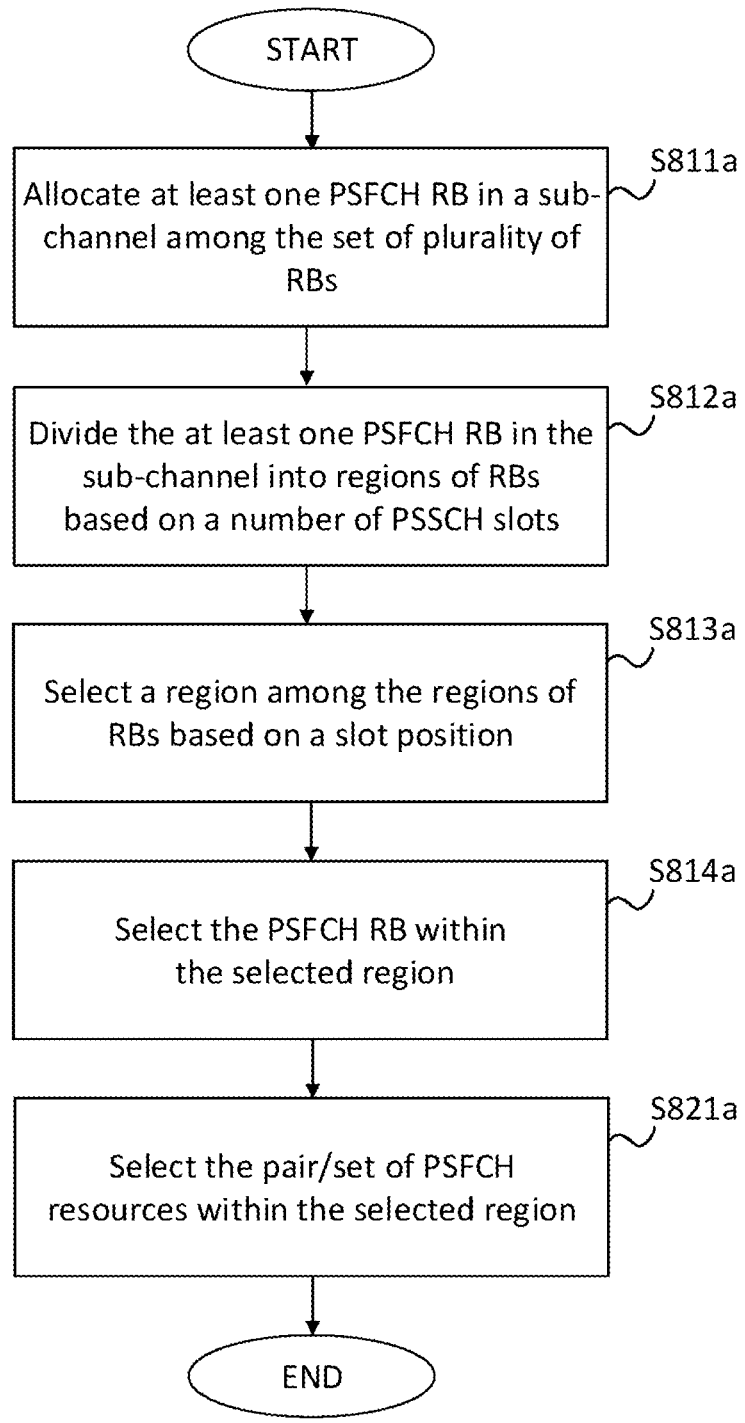
FIGS. 11A and 11B show different implementations how a PSFCH Resource Block is allocated in a first step and how a pair/set of PSFCH resources is determined in a second step.
Figure 11B:
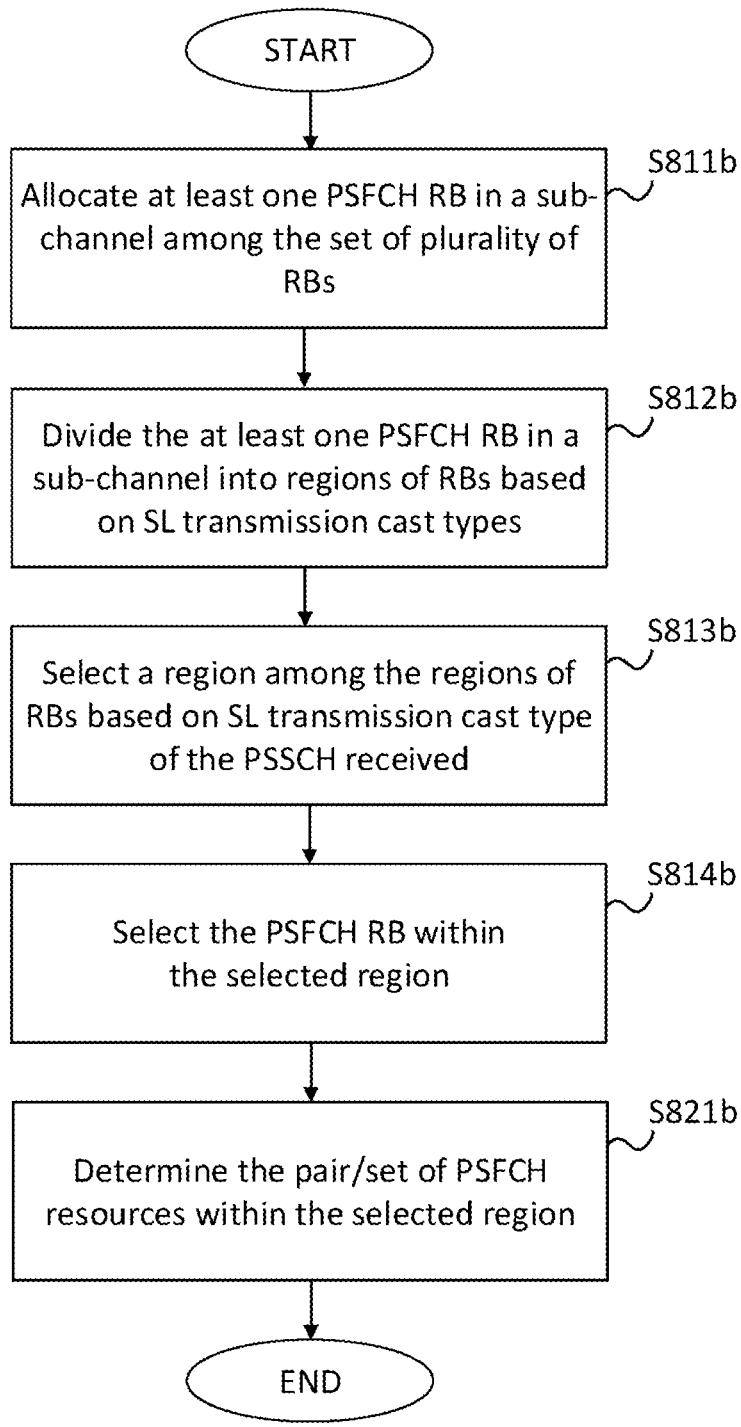

As described with FIG. 8 above, the instructions for the step-wise determination of the PSFCH resource/sequence for HARQ reporting by a UE, for example, by the Rx-UE receiving a packet TB and being requested to feed back a HARQ report to the Tx-UE, comprises, as a first step, allocating (S810) the PSFCH RB among a set of plurality of RBs based on the first characteristic with regard to the SL communication and, as a second step, determining (S820) a pair/set of PSFCH resources within the allocated PSFCH RB based on the second characteristic with regard to the SL communication. FIGS. 11A and 11B now show different implementations how the PSFCH RB may be allocated in the first step and how the pair/set of PSFCH resources may be determined in the second step. In other words, FIGS. 11A and 11B show additional steps that the first step and the second step may comprise. The third step that has been described in reference to FIG. 8 can still be performed afterwards.

First of all, the flowchart according to an implementation shown in FIG. 11A is described in great detail below.

In order to allocate the PSFCH RB among the set of plurality of RBs, at least one PSFCH RB is allocated (S811a) in a sub-channel among the set of plurality of RBs and the at least one PSFCH RB in a sub-channel may be divided or split (S812a) into regions of RBs based on a number of PSSCH slots associated with a PSFCH slot or based on a number of PSSCH slots within a HRW, wherein each region comprises at least one RB. Thus, the at least one PSFCH RB in the sub-channel may be divided into the plurality of regions based on parameter N of the HRW. If the PSFCH RB is only allocated among the plurality of RBs configured for PSFCH transmission, the plurality of RBs configured for the PSFCH transmission may be divided into the plurality of regions based on parameter N of the HRW.

For example, the bandwidth used for sidelink communication is divided into multiple sub-channels in the frequency domain, the sub-channels being a group of multiple RBs. As has been shown with regard to FIGS. 1, 2, 3, 9, and 10, one sub-channel may comprise 10 RBs, the RBs being used for PSSCH and PSFCH transmission. One RB may comprise a plurality of resource elements, for example 12 resource elements per RB. However, one sub-channel may also comprise more or less RBs based on the configuration of a sub-channel. The PSFCH RB may be a RB used for PSFCH transmission, in particular used for HARQ reporting in a PSFCH slot.

Figure 12:
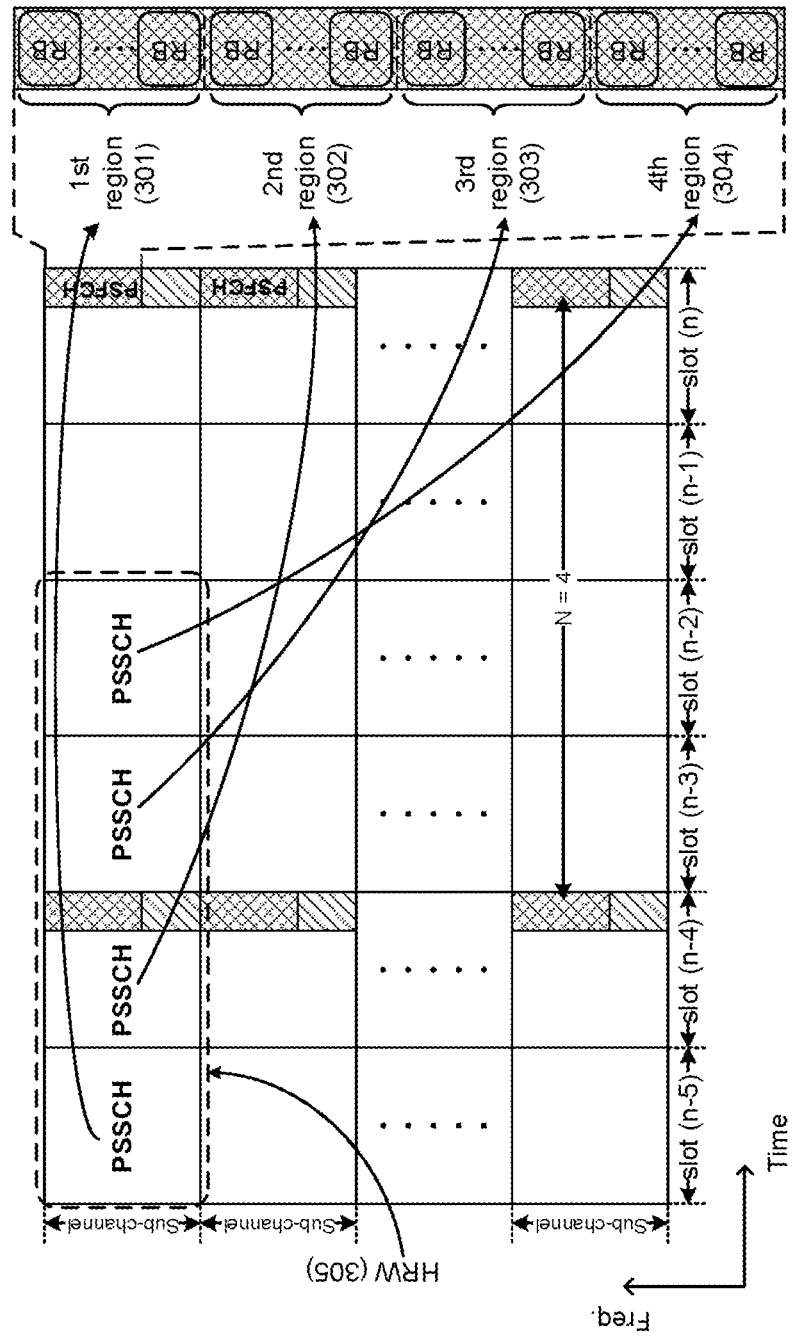
FIG. 12 shows an exemplary PSSCH and PSFCH setup where a plurality of Resource Blocks in a PSFCH slot is divided into a plurality of regions according to an implementation.

FIG. 12 shows an exemplary PSSCH and PSFCH setup where a plurality of RBs in the PSFCH slot is divided into a plurality of regions of RBs according to an implementation. In FIG. 12, N=4, i.e. the HRW (305) comprises four PSSCH slots, wherein one PSFCH slot carrys HARQ reports for up to four PSSCH slots. Thus, the plurality of RBs in the sub-channel, here the plurality of RBs configured for PSFCH transmission in the sub-channel, are split or divided into four regions of RBs, see 1st region (301), 2nd region (302), 3rd region (303), and 4th region (304). Thus, the split or division of regions in this implementation is based on the number of PSSCH slots within the HRW (305). If, as another example, N=1, i.e. one PSSCH slot is within the HRW, i.e. one PSFCH slots carries a HARQ report for one PSSCH slot, only 1 region is needed.

Each region may comprise at least one RB. For example, when the total number of RBs in a sub-channel is small, each region may only comprise a small number of RBs. However, when the total number of RBs in a sub-channel is large, each region may comprise multiple RBs. For example, if a sub-channel has a total of 20 PSFCH RBs and it needs to carry HARQ reports for up to four PSSCH slots, i.e. N=4, then 5 RBs may be allocated evenly to each region, for example the 1st region (301), 2nd region (302), 3rd region (303), and 4th region (304) shown in FIG. 12. If it is assumed that each RB is able to carry 12 different PSFCH resources/sequences simultaneously due to 12 resource elements per RB and if it is assumed that each Rx-UE is allocated with four resources to represent all possible ACKNACK combinations for two PSSCH packet TBs, then each RB can multiplex HARQ reports for three Rx-UEs. This means that the RBs for each region may accommodate up to 15 Rx-UEs simultaneously. The size between each region, in terms of number of RBs, does not necessarily to be the same or the total number of RBs per sub-channel does not need to be evenly distributed among the regions of RBs.

Furthermore, as shown in FIG. 11A, a region may be selected (S813a) among the regions of RBs obtained in S812a based on a slot position in which the corresponding PSSCH is received. Thus, if N>1, for example N=2 or N=4, the RBs in a sub-channel will be divided into a number of regions of RBs>1 (in the case of N=2 into two regions of RBs and in the case of N=4 in four regions of RBs). In order to now select a region from the plurality of regions of RBs, the Rx-UE uses the slot position in which the corresponding, PSSCH is received. For example, the Rx-UE uses the slot position in which the PSSCH packet TB(s), i.e. the packet TB(s) transmitted in PSSCH slot(s), is transmitted. In the exemplary setup illustrated in FIG. 12, the Rx-UE selects the 1st region (301) among the regions of RBs if PSSCH TB(s) is received in time slot (n−5), the 2nd region (302) among the regions of RBs if PSSCH TB(s) is received in time slot (n−4), the 3rd region (303) among the regions of RBs if PSSCH TB(s) is received in time slot (n−3), and the 4th region (304) among the regions of RBs if PSSCH TB(s) is received in time slot (n−2).

Then, as shown in FIG. 11A, the PSFCH RB may be selected (S814a) within the region selected in S813a based on the first characteristic with regard to the SL communication. In order to determine the pair/set of PSFCH resources within the PSFCH RB, as shown in S820 of FIG. 8, the pair/set of PSFCH resources may then be selected (S821a) within the selected region based on the second characteristic with regard to the SL communication. The pair/set of PSFCH resources may be a pair of cyclic shifted sequences in the PSFCH RB. After step S821a of FIG. 12, the step S830 described with regard to FIG. 8 may be performed.

The first characteristic with regard to the SL communication may comprise at least one of a SL transmission cast type, a member identification (member ID or member_ID) of a groupcast communication, and a number of PSSCH TBs received during the SL communication.

According to another implementation, the first characteristic with regard to the SL communication may comprise the member ID of the groupcast communication, wherein the member_ID, when available, is used to determine the PSFCH RB within the selected region.

The second characteristic with regard to the SL communication may comprise at least the (pre-)configured cyclic shift allocation and/or a source identification (source_ID). For example, the Rx-UE uses a (pre-)configured cyclic shift pairs or offset index, and/or source_ID of the Tx-UE to derive the pair/set of PSFCH resources within the PSFCH RB, wherein a PSFCH resource/sequence among the pair/set of PSFCH resources may be used to transmit a HARQ report.

The use of source_ID of the Tx-UE in the selection of the pair/set of PSFCH resources is to resolve the problem of hidden nodes in a SL communication, where one Tx-UE is far away from another Tx-UE and both transmit their PSSCH packet TB(s) to the Rx-UE using the same PSSCH slot and sub-channel.

Lastly, based on the ACK and/or NACK decoding results for the received PSSCH packet TB(s), the Rx-UE may select a final PSFCH resource/sequence to represent the HARQ report comprising ACK and/or NACK information.

For example, if a Rx-UE within a groupcast communication, like connection-oriented groupcast, has been assigned with a member_ID=10 and it receives a PSSCH packet TB in the 2nd PSSCH slot within the HRW of N=4 (like in FIG. 12), the Rx-UE will then be able to firstly select the 2nd region for transmitting its HARQ report to the Tx-UE. Since the Tx-UE has only transmitted one PSSCH packet TB to the Rx-UE and there are 12 PSFCH resources per RB to multiplex up to 6 pairs of ACK/NACK reports, the Rx-UE determines that its position is 10−6=4 in the second RB within the 2nd region. Here, the position refers to the index of a pair of PSFCH resources (cyclic shift sequences) within a PSFCH RB. As described above, there may be 12 PSFCH resources/cyclic shifted sequences for multiplexing up to 6 pairs of ACK or NACK results in a PSFCH RB. When a member_ID is 10 and there are total of 6 pairs in a PSFCH RB, then the "pair" index that the Rx-UE should use to send ACKNACK report is 10−6=4$^{th}$ pair or position. It can be compared to a mathematical modulo ("mod") operation, which is used in several 3GPP specifications (see, for example, 3GPP TS 36.213 Version 15.10.0, page 499, Table 16.4.1.3-4, Table 16.4.1.3-6, Table 16.4.1.3-8, pages 529 and 531; or 3GPP TS 38.213 Version 15.7.0, pages 49, 57, and 78). If it is assumed that the cyclic shift offset index is (pre-)configured to be zero for this resource pool, the first pair index within a RB should use PSFCH resource/sequence 0 for ACK information and PSFCH resource/sequence 6 for NACK information. Since the Rx-UE is fourth in the second RB of the 2nd region, it can be derived that PSFCH resource 3 should be used for feeding back ACK information, like ACK bitmap, and PSFCH resource 9 for NACK information, like NACK bitmap.

As another example, if the Rx-UE is engaged in a SL unicast communication session with just one Tx-UE and one Rx-UE in a group, the first RB of a region may be always used by the Rx-UE to feed back its HARQ report to the Tx-UE. Afterwards, the (pre-)configured cyclic shift pairs or offset index, and/or source_ID of the Tx-UE may then determine the pair/set of PSFCH resources within the RB, wherein a PSFCH resource/sequence among the pair/set of PSFCH resources/sequences may be used for ACK and NACK reporting.

Now, the flowchart shown in FIG. 11B is described in great detail below.

According to another implementation, in order to allocate the PSFCH RB among the set of plurality of RBs, at least one PSFCH RB is allocated (811*b*) in a sub-channel among the set of plurality of RBs and the at least one PSFCH RB in a sub-channel may be divided (S812*b*) into regions of RBs based on SL transmission cast types (instead of based on a number of PSSCH slots associated with a PSFCH slot or based on a number of PSSCH slots within a HRW, as described with regard to FIG. 11A), wherein each region comprises at least one RB.

For example, the SL transmission cast types comprise unicast (UC) for one-to-one direct communication, connection-less groupcast (CL-GC), and connection-oriented groupcast (CO-GC). In this regard, the at least one PSFCH RB in the sub-channel, e.g. a plurality of RBs in the sub-channel configured for PSFCH transmission, may be divided into a first region, a second region, and a third region, the first region being allocated for HARQ reporting of UC, the second region being allocated for HARQ reporting of CL-GC (a SL groupcast communication where all UEs within a same SLgroup do not know the size of the SL group), and the third region being allocated for HARQ reporting of CO-GC (a groupcast session where all UEs within the same SL group have knowledge about the SL group size). UEs in a SL group may be able to communicate with each other using SL communication.

For the case of N=1, similar to the previous scenario, it is not needed to split or divide the total number of PSFCH RBs in a sub-channel into different regions since there is only one PSSCH slot within one HRW. As such, all of the allocated RBs for PSFCH transmissions within a sub-channel may be used for HARQ reporting from one or multiple Rx-UEs. Depending on the cast type of the transmitted PSSCH TB(s) in a slot within the HRW it is possible that just one Rx-UE feeds back its ACKNACK decoding results in a HARQ report in the PSFCH within a sub-channel for an unicast session or it is possible that multiple Rx-UEs share the RBs and PSFCH resources/sequences to feed back their HARQ reports for a groupcast communication.

Figure 13:
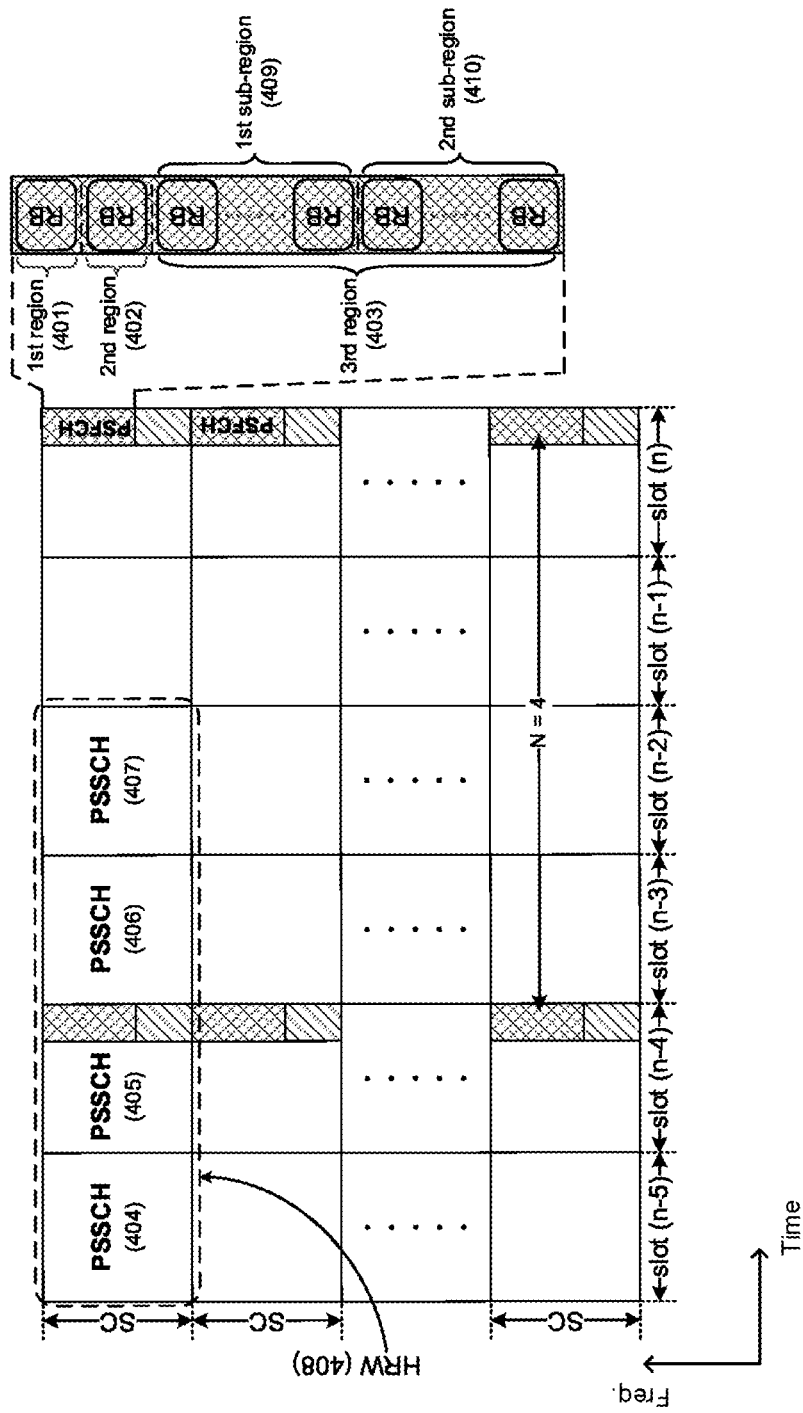
FIG. 13 shows an exemplary PSSCH and PSFCH setup where a plurality of Resource Blocks in a PSFCH slot is divided into a plurality of regions according to another implementation.

As for the case when N>1, for example, N=2 or N=4, as described earlier, three separate regions may be defined for HARQ reporting of different SL transmission cast types, namely unicast, connection-less groupcast and connection-oriented groupcast. This is also shown in FIG. 13 which shows an exemplary PSSCH and PSFCH setup where the plurality of RBs in the PSFCH slot is divided into a plurality of regions according to another implementation. Here, the plurality of RBs in the PSFCH slot is divided into three regions based on the SL transmission cast types. The size between each region, in terms of number of RBs, does not necessarily to be the same or the total number of RBs per sub-channel does not need to be evenly distributed among the regions. This can be seen in FIG. 13, where the 1st region (401) and the 2nd region (402) each comprises one PSFCH RB and the 3rd region (403) comprises a plurality of PSFCH RBs.

In particular, in reference to FIG. 13, the plurality of PSFCH RBs in a sub-channel are divided into three separate regions for the three different SL transmission cast types unicast, connection-less groupcast, and connection-oriented groupcast. For the first two regions (401) and (402), the PSFCH RBs may be allocated for the purpose of feeding back unicast and connection-less groupcast ACK/NACK results and the order in which the PSFCH RBs are allocation is not important. It should be noted that each region is assigned to only one SL transmission cast type (either unicast or connection-less groupcast), and each region may be allocated with at least one PSFCH RB. In FIG. 13, the first two regions (401) and (402) are each allocated with only one PSFCH RB, wherein one of the regions is used for unicast HARQ reporting and the other region is used for connection-less groupcast HARQ reporting. However, it is also possible that the first two regions (401) and (402) each comprise four PSFCH RBs due to N=4. If N=2, each region may comprise two PSFCH RBs. For the 3rd region (403), the PSFCH RBs are allocated for feeding back connection-oriented groupcast ACK/NACK results. The 3rd region (403) may comprise all the remaining RBs for PSFCH transmission within the sub-channel that are not allocated to the 1st and 2nd regions.

When there is only one PSFCH RB allocated for a region or cast type, HARQ reports of the same cast type from all PSSCH slots, for example PSSCH slots (404), (405), (406), and (407), within the HRW (408) are multiplexed in that PSFCH RB. For example, if all four PSSCH slots comprise unicast transmissions and all four PSSCH slots require HARQ reporting from their Rx-UEs, four HARQ reports may be multiplexed within the same PSFCH RB in, for example, region (401) or (402).

Further, as shown in FIG. 11B, a region may be selected (S813*b*) among the regions of RBs obtained in S812*b* based on a SL transmission cast type of the PSSCH received. If, for example, the SL transmission cast type of the received PSSCH is unicast, the 1st region will be selected among the regions of RBs. If, for example, the SL transmission cast type of the received PSSCH is connection-less groupcast, the 2nd region will be selected among the regions of RBs. And if, for example, the SL transmission cast type of the received PSSCH is connection-oriented groupcast, the 3rd region will be selected among the regions of RBs.

Then, the PSFCH RB within the selected region may be selected (S814*b*) based on the first characteristic with regard to the SL communication, and the pair/set of PSFCH resources may be determined (S821*b*) within the selected region based on the second characteristic with regard to the SL communication. After the step S821*b* illustrated in FIG. 11B, the step S830 of FIG. 8 may be performed.

According to an implementation, the region may be further divided into a plurality of sub-regions based on a number of PSSCH slots associated with a PSFCH slot or based on a number of PSSCH slots within a HRW, wherein each sub-region comprises at least one RB. A sub-region may be selected among the plurality of sub-regions based on a slot position in which the PSSCH is received during the SL communication. Then, the PSFCH RB may be selected within the selected sub-region based on the first characteristic with regard to the SL communication. Afterwards, the pair/set of PSFCH resources/sequences may be selected within the selected PSFCH RB based on the second characteristic with regard to the SL communication. If, however, a region only comprises one RB, for example, as is the case for the 1st region (401) and the 2nd region (402) illustrated in FIG. 13, the region will not be divided into a plurality of sub-regions.

Again, as also described above, the first characteristic with regard to the SL communication may comprise at least one of a member identification (member ID or member_ID) of a groupcast communication and a number of transmitted PSSCH packet TBs. When, for example, the member_ID of the groupcast communication is available, the member_ID is used to select the PSFCH RB.

In addition, the second characteristic with regard to the SL communication may comprise at least the configured cyclic shift pairs or offset index, and/or source identification (source ID or source_ID).

In this case, the combination of (pre-)configured cyclic shift allocation, for example the cyclic shift pairs or offset index, and the PSSCH slot position within the HRW may determine the exact pair/set of PSFCH resources/sequences to be used by each Rx-UE within the RB. If the hidden node problem needs to be resolved, source_ID of the Tx-UE may be also taken into account. When the HRW comprise two PSSCH slots (in the case of N=2), two RBs may be allocated for a region or cast type. When the HRW comprise four PSSCH slots (in the case of N=4), four RBs may be allocated for a region or cast type. For these cases, HARQ reporting may be separated into different RBs based on the PSSCH slot position in which the TB(s) is received. As in FIG. 13, the 1st region and the 2nd region each only comprises one RB, the HARQ reporting does not have to be separated into different RBS based on the PSSCH slot position in which the TB(s) is received.

For the 3rd region (403) in FIG. 13, a plurality of RBs are allocated for feeding back connection-oriented groupcast ACK/NACK results. In this case, the 3rd region may be further separated into sub-regions of RBs depending on the number of PSSCH slots within the HRW. For the case of N=2, i.e. two PSSCH slots within the HRW, the 3rd region may separated into two sub-regions (409) and (410), one sub-region for each PSSCH slot. For the case of N=4, i.e. four PSSCH slots within the HRW, the 3rd region may separated into two or four sub-regions. For example, if the indicated number of PSSCH slots for connection-oriented groupcast is (pre-) configured to be four in the HRW, then the plurality of RBs in the 3rd region may be separated into four sub-regions, each sub-region being designated for one PSSCH slot within the HRW. For example, if there are in total 8 RBs for the 3rd region and the indicated number of PSSCH slots for connection-oriented groupcast is two within the HRW (408) (N=2), then the 3rd region may be separated into two sub-regions (409) and (410) and four RBs may be allocated to each sub-region or PSSCH slot (see also FIG. 13). Once the sub-regions are clearly divided, the process for a Rx-UE to select a PSFCH RB within the sub-region and the pair/set of PSFCH resources within the selected PSFCH RB may be the same to the case when N=1, where Rx-UE's member_ID or sequence within a groupcast, number of transmitted PSSCH TBs, cyclic shift pairs or offset index, and/or source_ID of the Tx-UE can be used. Then, based on the ACK or HACK decoding result for the received PSSCH TB(s), the Rx-UE may determine the PSFCH resource/sequence from the pair/set of PSFCH resources to feed back a HARQ report to the Tx-UE.

The determination of the PSFCH RB and the pair/set of PSFCH resources based on either the process described with regard to FIG. 11A or the process described with regard to FIG. 11B may be based on a starting sub-channel index of the corresponding PSSCH received during the SL communication. For example, the determination of the PSFCH RB and the pair/set of PSFCH resources may start from a same starting sub-channel index used for the PSSCH received during the SL communication.

Solutions how to determine a PSFCH resource/sequence in a sub-channel for PSFCH transmission with regard to SL communication have been described in detailed above. The above described PSFCH capacity and multiplexing issues have been resolved by adjusting the amount of PSFCH radio resources based on demand and by controlling the slots in which a transmission cast type with large amount of ACKNACK feedback can be transmitted, wherein increase in control signaling has been avoided. In addition, all PSFCH resources have been efficiently utilized.

In addition, PSFCH mapping and ACK/NACK multiplexing rules have been defined above which eliminate the need for the Tx-UE or Rx-UE to indicate or inform, in the control signaling, the other UE the exact location and PSFCH resources/sequences to use for feeding back HARQ reports. Therefore, the amount of control signaling overhead can be reduced.

Furthermore, by allocating designated locations and PSFCH resources/sequences based on PSSCH slots or transmission cast types, issues of the need to reserve PSFCH resources/sequences for ACK/NACK feedback and the risk of PSFCH transmission collisions are avoided.

As mentioned above, the network node 410 as well as the UEs 420 and 430 may perform certain operations or processes described herein using the circuitry discussed with regard to FIGS. 5 and 6 above. These operations may be performed in response to the processing circuitry or processor executing software instructions contained in a computer-readable medium, such as the main memory, ROM and/or storage device. A computer-readable medium may be defined as a physical or a logical memory device. For example, a logical memory device may include memories within a single physical memory device or distributed across multiple physical memory devices. Each of the main memory, ROM and storage device may include computer-readable media with instructions as program code. The software instructions may be read into the main memory for another computer-readable medium, such as a storage device or from another device via the communication interface.

Further, the software instructions contained in the main memory may cause processing circuitry including a data processor, when executed on processing circuitry, to cause the data processor to perform operations or processes described herein. Alternatively, hard-wired circuitry may be used in place or on in combination with the software instructions to implement processes and/or operations described herein. Thus, implementations described herein are not limited to any specific combination of hardware and software.

The physical entities according to the different implementations of the present disclosure, including the elements, units, modules, nodes and systems may comprise or store computer programs including software instructions such that, when the computer programs are executed on the physical entities, steps and operations according to the implementations of the present disclosure are carried out, i.e. cause data processing means to carry out the operations. In particular, implementations of the present disclosure also relate to computer programs for carrying out the operations and steps according to the implementations of the present disclosure, and to any computer-readable medium storing the computer programs for carrying out the above-mentioned methods.

Where the term module is used, no restrictions are made regarding how distributed these elements may be and regarding how gathered these elements may be. That is, the constituent elements, modules, units of the network node 410 as well as the UEs 420 and 430 may be distributed in different software and hardware components or other devices for bringing about the intended function. A plurality of distinct elements and modules may also be gathered for providing the intended functionality. For example, the elements, modules, and functions of the nodes may be realized by a microprocessor and a memory similar to the above node including a bus, a processing unit, a main memory, ROM, etc. The microprocessor may be programmed such that the above-mentioned operations, which may be stored as instructions in the memory, are carried out.

Further, the elements, modules, and units of the apparatus may be implemented in hardware, software, Field Programmable Gate Arrays (FPGAs), application-specific integrated circuits (ASICs), firmware or the like.

It will be apparent to those skilled in the art that various modifications and variations can be made in the entities and methods of the present disclosure as well as in the construction of the present disclosure without departing from the scope or spirit of the present disclosure.

The present disclosure has been described in relation to particular implementations and examples which are intended in all aspects to be illustrative rather than restrictive. Those skilled in the art will appreciate that many different combinations of hardware, software and/or firmware will be suitable for practicing the present disclosure.

Moreover, other implementations of the present disclosure will be apparent to those skilled in the art from consideration of the specification and practice of the present disclosure disclosed herein. It is intended that the specification and the examples be considered as exemplary only. To this end, it is to be understood that inventive aspects lie in less than all features of a single foregoing disclosed implementation or configuration. Thus, the true scope and spirit of the present disclosure is indicated by the following claims.

What is claimed is:

1. A method of operating a user equipment, UE, performing Sidelink, SL, communication, the method comprising:
    performing, by the UE, a procedure, the procedure allowing the UE to determine a Physical Sidelink Feedback Channel, PSFCH, resource and/or sequence for Hybrid Automatic Repeat Request, HARQ, reporting with regard to the SL communication,
    wherein the procedure is used for determination of the PSFCH resource and/or sequence for the HARQ reporting based on a first and second characteristic with regard to the SL communication; wherein the procedure comprises:
    determining a PSFCH Resource Block, RB, among a set of plurality of RBs based on the first characteristic with regard to the SL communication;
    determining a set of PSFCH resources within the determined PSFCH RB based on the second characteristic with regard to the SL communication; and
    selecting the PSFCH resource from the set of PSFCH resources and/or sequence for Hybrid Automatic Repeat Request, HARQ, reporting based on an Acknowledgement, ACK, or Negative Acknowledgement, NACK, decoding result of a Physical Sidelink Shared Channel, PSSCH, packet Transport Block, TB received during the SL communication.

2. The method according to claim 1, further comprising:
    transmitting an ACK or NACK decoding result for the HARQ reporting using the PSFCH resource/sequence.

3. The method according to claim 1, wherein the set of plurality of RBs is configured for PSFCH transmission and reception, and represented as a bitmap.

4. The method according to claim 1, wherein
    the set of plurality of RBs is configured using SL resource pool configuration comprising a PSFCH resource allocation and HARQ reporting related information.

5. The method according to claim 4, wherein
    the SL resource pool configuration comprises at least one PSFCH parameter related to time domain allocation, frequency domain allocation, or cyclic shift allocation.

6. The method according to claim 4, further comprising:
    receiving the SL resource pool configuration from a network node or from pre-configuration.

7. The method according to claim 1, wherein the method further comprises:
    allocating at least one PSFCH RB in a sub-channel among the set of plurality of RBs;
    dividing the at least one PSFCH RB in a sub-channel into regions of RBs based on a number of PSSCH slots associated with a PSFCH slot or based on a number of PSSCH slots within a HARQ reporting window, HRW, wherein each region comprises at least one RB;
    selecting a region among the regions of RBs based on a slot position in which the corresponding PSSCH is received;
    selecting the PSFCH RB within the selected region based on the first characteristic with regard to the SL communication; and
    determining the set of PSFCH resources within the selected region based on the second characteristic with regard to the SL communication.

8. The method according to claim 7, wherein
    the first characteristic with regard to the SL communication comprises a member ID of the groupcast communication, wherein the member ID, when available, is used to determine the PSFCH RB within the selected region.

9. The method according to claim 7, wherein
    the second characteristic with regard to the SL communication comprises at least the configured cyclic shift allocation and/or a source identification, ID.

10. The method according to claim 7, wherein
    the determination of the at least one PSFCH RB and the set of PSFCH resources is based on a starting sub-channel index of the corresponding PSSCH received during the SL communication.

11. A user equipment, UE, comprising a processor and memory, said memory containing instructions executable by said processor, whereby said UE is configured to perform a procedure, the procedure allowing the UE to determine a Physical Sidelink Feedback Channel, PSFCH, resource and/or sequence for Hybrid Automatic Repeat Request, HARQ, reporting with regard to the SL communication,
    wherein the procedure is used for determination of the PSFCH resource and/or sequence for the HARQ reporting based on a first and second characteristic with regard to the SL communication; wherein the UE is further configured to:
    determine a PSFCH Resource Block, RB, among a set of plurality of RBs based on the first characteristic with regard to the SL communication;

determine a set of PSFCH resources within the determined PSFCH RB based on the second characteristic with regard to the SL communication; and select the PSFCH resource from the set of PSFCH resources and/or sequence for Hybrid Automatic Repeat Request, HARQ, reporting based on an Acknowledgement, ACK, or Negative Acknowledgement, NACK, decoding result of a Physical Sidelink Shared Channel, PSSCH, packet Transport Block, TB received during the SL communication, wherein the set of plurality of RBs is configured for PSFCH transmission and reception, and represented as a bitmap.

12. The UE according to claim 11, further configured to:
transmit an ACK or NACK decoding result for the HARQ reporting using the PSFCH resource/sequence.

13. The UE according to claim 11, wherein
the set of plurality of RBs is configured using SL resource pool configuration comprising a PSFCH resource allocation and HARQ reporting related information,
wherein
the SL resource pool configuration comprises at least one PSFCH parameter related to time domain allocation, frequency domain allocation, or cyclic shift allocation.

14. The UE according to claim 13, further configured to:
receive the SL resource pool configuration from a network node or from pre-configuration.

15. The UE according to claim 11, further configured to:
allocate at least one PSFCH RB in a sub-channel among the set of plurality of RBs;
divide the at least one PSFCH RB in a sub-channel into regions of RBs based on a number of PSSCH slots associated with a PSFCH slot or based on a number of PSSCH slots within a HARQ reporting window, HRW, wherein each region comprises at least one RB;
select a region among the regions of RBs based on a slot position in which the corresponding PSSCH is received;
select the PSFCH RB within the selected region based on the first characteristic with regard to the SL communication; and
determine the set of PSFCH resources within the selected region based on the second characteristic with regard to the SL communication.

16. The UE according to claim 15, wherein
the first characteristic with regard to the SL communication comprises a member ID of the groupcast communication, wherein the member ID, when available, is used to determine the PSFCH RB within the selected region,
the second characteristic with regard to the SL communication comprises at least the configured cyclic shift allocation and/or a source identification, ID.

17. The UE according to claim 15, wherein
the determination of the at least one PSFCH RB and the set of PSFCH resources is based on a starting sub-channel index of the corresponding PSSCH received during the SL communication.

18. A non-transient computer-readable storage medium comprising instructions which, when executed by a computer, cause the computer to carry out the steps of:
performing, by a user equipment, UE, a procedure, the UE performing Sidelink, SL, communication, wherein the procedure allows the UE to determine a Physical Sidelink Feedback Channel, PSFCH, resource and/or sequence for Hybrid Automatic Repeat Request, HARQ, reporting with regard to the SL communication,
wherein the procedure is used for determination of the PSFCH resource and/or sequence for the HARQ reporting based on a first and second characteristic with regard to the SL communication; wherein the procedure comprises:
determining a PSFCH Resource Block, RB, among a set of plurality of RBs based on the first characteristic with regard to the SL communication;
determining a set of PSFCH resources within the determined PSFCH RB based on the second characteristic with regard to the SL communication; and
selecting the PSFCH resource from the set of PSFCH resources and/or sequence for Hybrid Automatic Repeat Request, HARQ, reporting based on an Acknowledgement, ACK, or Negative Acknowledgment, NACK, decoding result of a Physical Sidelink Shared Channel, PSSCH, packet Transport Block, TB received during the SL communication.

* * * * *